Jan. 25, 1966    J. C. SWAIN ETAL    3,230,711
HYDRAULIC MOTOR MEANS

Filed Feb. 13, 1964    7 Sheets-Sheet 1

INVENTORS
J. C. SWAIN
G. E. MANNING
D. L. THOMAS
BY
*Lieber & Nilles*
ATTYS.

Jan. 25, 1966  J. C. SWAIN ETAL  3,230,711
HYDRAULIC MOTOR MEANS
Filed Feb. 13, 1964  7 Sheets-Sheet 2

INVENTORS
J. C. SWAIN
G. E. MANNING
BY D. L. THOMAS

Lieber & Nilles
ATTYS.

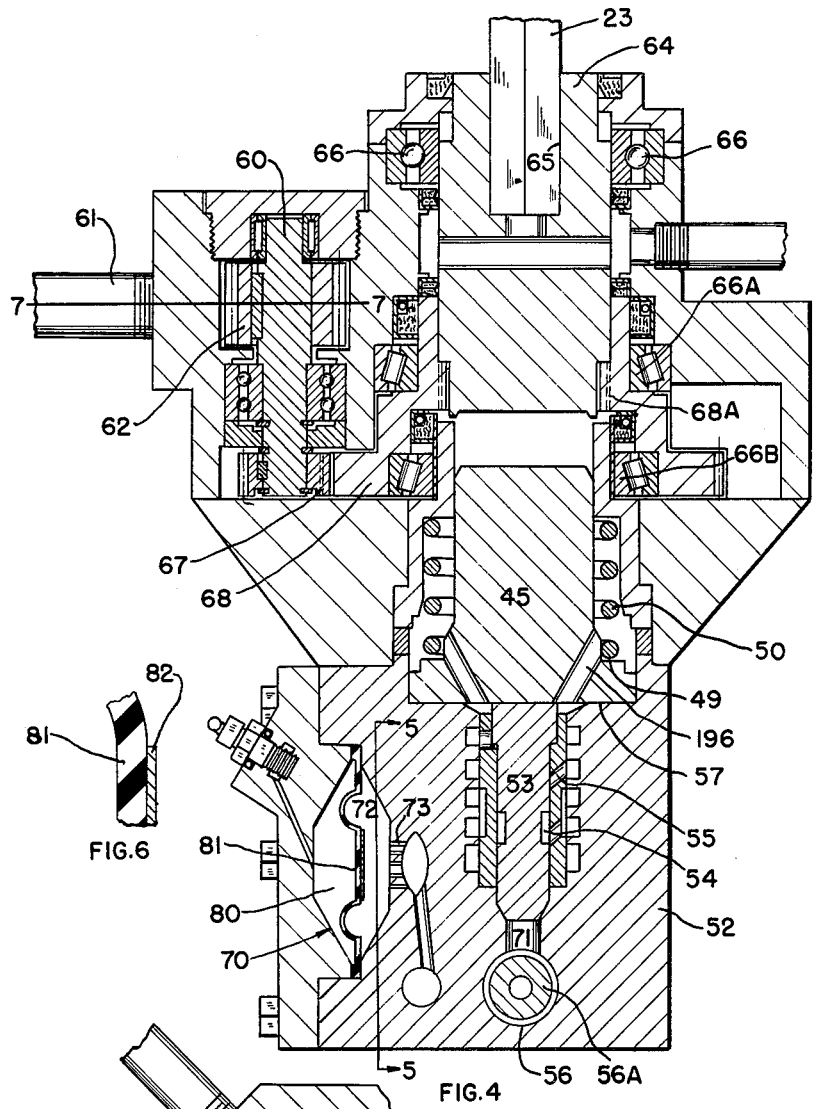
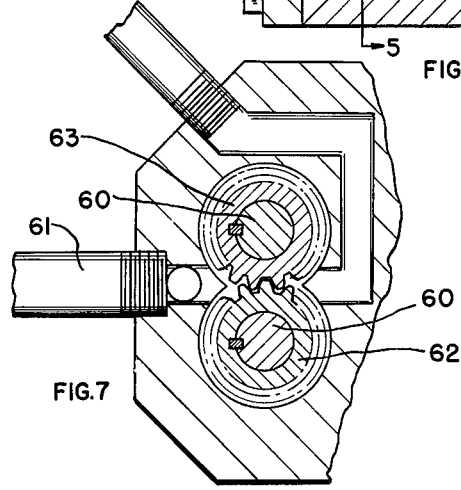

Jan. 25, 1966  J. C. SWAIN ETAL  3,230,711

HYDRAULIC MOTOR MEANS

Filed Feb. 13, 1964  7 Sheets-Sheet 4

INVENTORS
J. C. SWAIN
G. E. MANNING
D. L. THOMAS
BY Lieber & Nilles
ATTYS.

INVENTORS
J. C. SWAIN
G. E. MANNING
D. L. THOMAS
BY Lieber & Nilles
ATTYS.

Jan. 25, 1966

J. C. SWAIN ETAL 3,230,711

HYDRAULIC MOTOR MEANS

Filed Feb. 13, 1964

INVENTORS
J. C. SWAIN
G. E. MANNING
D. L. THOMAS

BY

Lieber & Nilles
ATTYS.

3,230,711
HYDRAULIC MOTOR MEANS

James C. Swain, George E. Manning, and David L. Thomas, Columbus, Ohio, assignors, by mesne assignments, to Westinghouse Air Brake Company, Wilmerding, Pa., a corporation of Pennsylvania
Filed Feb. 13, 1964, Ser. No. 344,668
18 Claims. (Cl. 60—51)

This invention relates to precussive devices, and more particularly to hydraulic motor means and controls for rotary percussive rock drills intended for either stoper or horizontal drilling.

A primary object of the invention is to provide an improved hydraulically operate rotary percussive drill having an improved hydraulic motor means and control therefore for actuating and controlling the striker of a hydraulic rotary percussive drill.

In the drilling of rock and ore it is customary to use pneumatic motors for stoper drilling operations and the like. However, pneumatically operated percussive devices require an air compressor which is necessarily located near the drill. In addition to this inconvenience, the provision of an air compressor is expensive and requires extra care and maintenance in usually inaccessible locations. Also, with pneumatic rock drills, the compressed air is ordinarily exhausted to atmosphere and, as a consequence, often occasions considerable blowing of dust and other particles which can be extremely irritable to a drill operator.

Furthermore, it is an accepted fact that the use of air is very inefficient as a working fluid primarily because it is exhausted to atmosphere while it is at nearly normal operating pressure and temperature, thus wasting relatively high amounts of potential energy and also contributing to a higher noise level as the air is exhausted. In addition, air is inherently not as efficient as hydraulic fluids due to the relatively compressible nature thereof.

Hydraulically actuated percussive devices that eliminate the need for a compressor have heretofore been proposed as disclosed in numerous patents, but, to date none has been commercially successful when applied to rock drills. Examples of hydraulic devices and/or tools may be found in U.S. Patents No. 2,894,724; No. 2,919,687; and No. 3,099,135 wherein hydraulic devices for a vibratory well bore jar, a spike driver, and a punch respectively are disclosed. While each of these patents discloses means for hydraulically delivering impact blows to a striking element or the like, none is concerned with providing a hydraulic motor means for rotary percussive rock drilling in the novel manner of the instant invention, and in addition, such devices do not provide for the control of a hydraulic motor means for a variety of hydraulic actuations, namely; impact, rotary, and rotary-impact, especially in conjunction with drill feed control.

In particular, Patent No. 2,919,678 discloses valving structure at the head of a working piston in combination with a pressure operated, spring biased control valve for a hydraulic hammer, but does not disclose a separate return for the working piston. Patents No. 2,120,992; No. 2,758,569; No. 2,894,724; and No. 3,099,135 do, however, embody a spring return means for the working piston. However, none of the above patents relates to the simple system of the instant invention relating to an improved valving arrangement and control therefore embodying a spring return working piston coacting with a spring or hydraulic return valve.

In the preferred embodiment, hydraulic motor means is disclosed in a hydraulic stoper drill having a drill feed support disclosed in greater detail in copending patent application, Serial No. 317,277 filed October 18, 1963, in the names of Albert Feucht and David L. Thomas for Rock Drilling Apparatus.

Also, in the preferred embodiment, a hydraulically actuated hydraulic return, pressure balanced reciprocating valve is shown as part of the hydraulic motor means. The hydraulically actuated reciprocating valve is of simple design and has the advantage of offering low leakage of hydraulic fluid while at the same time it is relatively compact and inexpensive. Further, the valve is easily timed to coact with the position of the striker element of the drill. In addition, such a valve is relatively insensitive to fluid viscosity, and offers little or not starting or sticking problems.

A striker element for the hydraulic stoper drill is shown as returnable from impact by a mechanical means and the initial impact is controlled by novel valving which in the preferred embodiment has a hydraulic return means and in another embodiment is provided with a mechanical means for return.

Furthermore, as hydraulic fluid flow in a reciprocating stopper drill is discontinuous, an accumulator is shown in the preferred embodiment as part of the stopper drill hydraulic system to, in effect, store fluid during slack demand and to supply adequate fluid in periods of peak demand. This offers an additional advantage of permitting the use of a fluid supply pump that handles the average hydraulic fluid supply loads rather than one that must handle peak loads.

Also, as some hydraulic fluid leakage might be encountered at the striker element and at the valving, a simple efficient scavenging system is provided to return any leakage to the fluid pressure return system.

Consideration is also given to the provision of a hydraulic rotary drive means for the stoper drill which is offset a small amount from the drive shaft to provide the necessary torque by gear reduction to allow the hydraulic motor means to turn at a higher, more efficient speed.

Also, it may be advantageous to make the stoper drill and hydraulic drive readily adaptable for powering a roof bolt tightening means which is believed to be advantageous in overall stoper drill operations.

These advantages of a hydraulically operated stoper drill having hydraulic motor means and control therefore are not found in the prior art devices.

It is therefore an additional object of this invention to provide an improved hydraulic motor means for a rock drill having the aforesaid advantages.

Another object of the invention is to provide an improved hydraulic motor means for control therefore for rotary percussive drilling machines which maintains fluid leakage at a minimum.

Still another object of this invention is to provide a hydraulic motor means having effective scavenging means therefore for returning fluid to a return system.

An additional object of this invention is to effectively and efficiently power a drill for rotary percussive drilling by a hydraulic motor means and control therefor.

It is a further object of this invention to provide a hydraulic control system for a stoper drill for variously rotating, impacting, and rotary-impacting a work tool attached thereto, and wherein a drill feed control system is related thereto.

These and other objects and advantages of the invention will become apparent from the following detailed description.

A clear conception of the several features constituting the present invention and of the mode of constructing and operating a hydraulic motor means of a rotary or rotary percussive drill embodying the improvements may be had by referring to the drawings accompanying and forming a part of this specification, wherein like reference characters designate the same or similiar parts in the various views;

FIG. 4 is an enlarged vertical traverse section through the device taken along line 4—4 of FIG. 3;

FIG. 6 is an enlarged section taken at a designated enclosed portion of FIG. 4;

FIG. 7 is a sectional plan view taken along line 7—7 of FIG. 4;

While the improvements have been illustrated and described as being advantageously embodied in a rock drill of the stoper type actuated by hydraulic fluid pressure, it is not intended to thereby unnecessarily limit or restrict the invention. It is also contemplated that certain descriptive terminology used herein shall be given the broadest possible interpretation consistent with the disclosure.

Figures 1, 2:
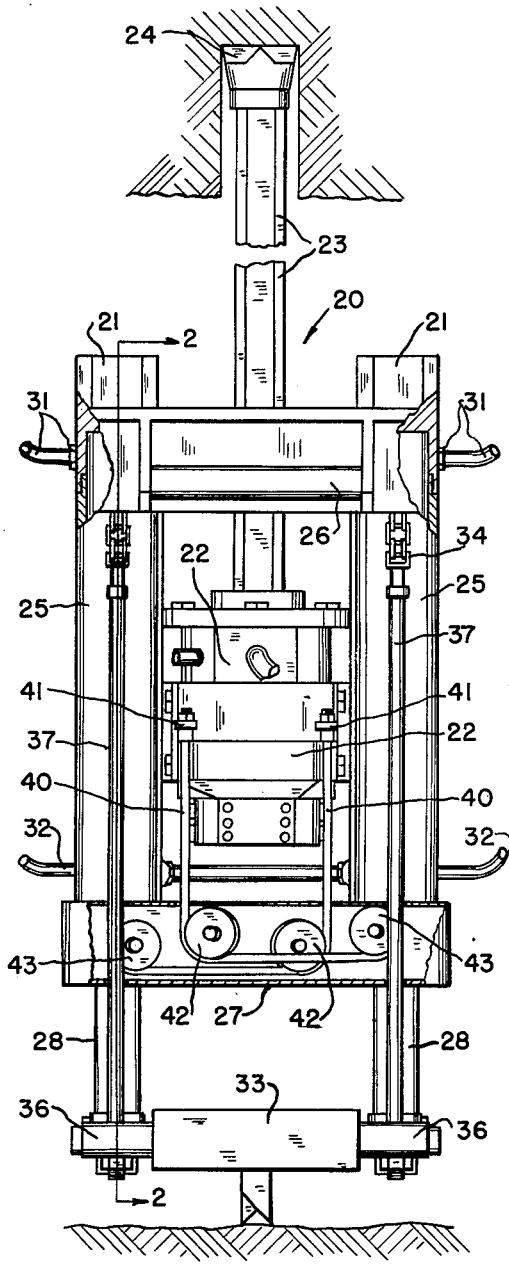
FIG. 1 is a side elevational view of a rock drilling apparatus embodying the invention.
FIG. 2 is a vertical traverse section through the device taken along line 2—2 of FIG. 1.
Figure 3:
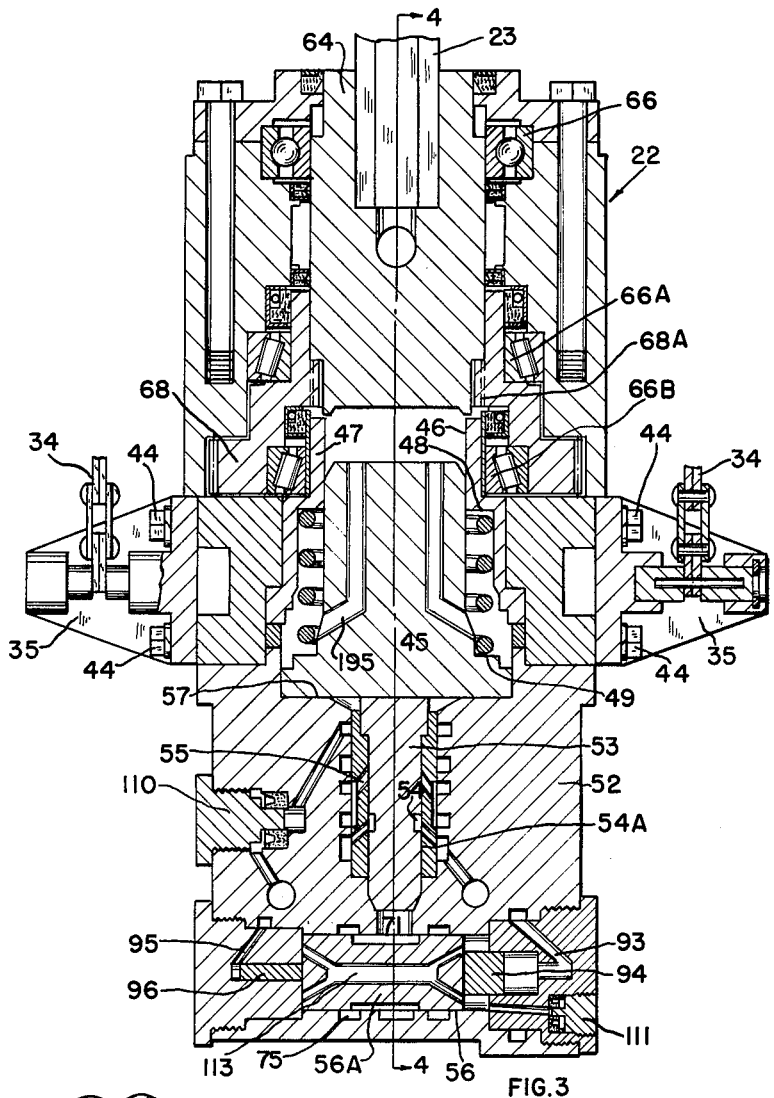
FIG. 3 is an enlarged vertical traverse section through the device taken along line 3—3 of FIG. 2.

Referring now to FIGS. 1 and 2, the reference numeral 20 designates generally a rotary or rotary-percussion rock drill, and the reference numeral 21 designates the supporting and feeding mechanism for the drill. A generally the supporting and feeding mechanism for the drill. A drill motor 22 is actuated by means of hydraulic fluid to rotate and impact drill steel 23 and bit 24 by a fluid pressure system to be described in greater detail hereinafter.

The drill motor 22 is supported for axial movement by the feed leg 21, the frame of which consists generally of a pair of laterally spaced parallel feed cylinders 25 bracketed together as by upper and lower cross members 26, 27 respectively to provide a rigid assembly.

The cylinders 25 carried by the double acting power pistons 28 are simultaneously actuated by means of fluid under pressure conducted to the displacement chambers 29 selectively above or below the confined heads 30 of the pistons via upper and lower feed conduits 31, 32 respectively. The extension and retraction of the cylinders is accomplished under the control of an operator, and the outwardly projecting ends of the pistons 28 are bracketed by an articulatable foot 33, described in detail in the copending application, Serial No. 317,277, previously referred to and identified. The drill 20 is, in turn connected to the foot 33 as by means of one or more chains 34 shown herein as two in number and each of which is attached at one end to a side clamp 35 carried by the motor 22 and at the other end to a laterally extending lug 36 on the foot 22 as by means of a relatively long tie rod 37 or the like, the chain 34 in each case being routed over hoist sheaves 38, 39 rotatably supported by the feed leg.

The structure of FIGS. 1 and 2 is tantamount to a telescopic feed and the feed cylinders 25 move one unit of length in relation to pistons 28 as fluid under pressure is admitted to the chambers 29.

To prevent chain kinking and/or possible jamming of the drill motor 22 during movement, a pair of cables 40 is attached as at 41 to the motor 22 adjacent to one of the side chain clamps 35 and the cable 40 is then routed over a pair of cable sheaves 42 and 43.

Thus the drill motor 22 is shown as supported and moved in the structure 21 to actuate the rotary-percussive drilling at bit 24 and coacts with the drill feed system as hereinafter described.

Reference is now made to the drawings for a detailed description of drill motor 22 illustrated in detail in FIGS. 3, 4, 8, and 9. The chains 34 are secured to side chain clamps 35 mounted on the housing of the drill motor 22 as by bolts 44. The motor 22 actuates a striker 45 reciprocable in a cylindrical opening 46 formed by an annular member 47 having an annular shoulder 48. The striker 45 is also provided with an annular shoulder 49, and a striker return spring 50 is held between shoulders 48 and 49, whereupon the spring 50 urges the striker 45 toward a seat 51 of impact piston housing 52. The piston housing 52 is provided with an impact piston 53 having an annular piston groove 54 for communicating with a plurality of ports 55 upon reciprocation of the piston 53 as hereinafter described. A valve unit 56a is also provided for fluid pressure reciprocation in a bore 56 of housing 52, wherein the reciprocation is related to and controls that of impact piston 53 and attendant grooves as described hereinunder.

In FIG. 4 the upper portion of motor housing 52 forms a support housing for rotary hydraulic gear unit 60, driven by fluid pressure entering an inlet 61 to drive gears 62, 63 to rotate drill steel support 64 to rotate the drill steel 23 carried in elongated recess 65. Drill steel support 64 carried in bearing 66 and drive member 68, in turn supported between tapered bearings 66a, 66b, are rotatably coupled through sliding spline 68a.

An accumulator 70 is located in housing 52 substantially adjacent impact piston 53 for dampening the pulsations resulting from the sudden starting and stopping of hydraulic fluid during the impact cycle (to be described in greater detail hereinafter). When the flow is not required by the piston, the accumulator continues to receive flow from the pump, thus storing energy which is delivered to the piston during the impact stroke.

Figure 5:
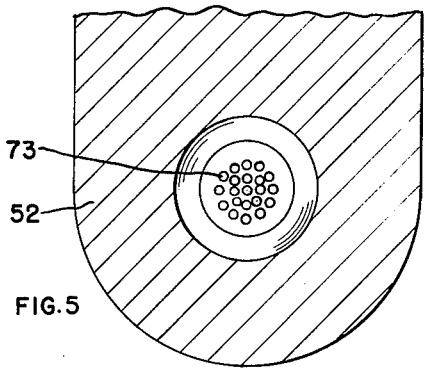
FIG. 5 is a somewhat fragmentary section taken along line 5—5 of FIG. 4.
Figure 8:
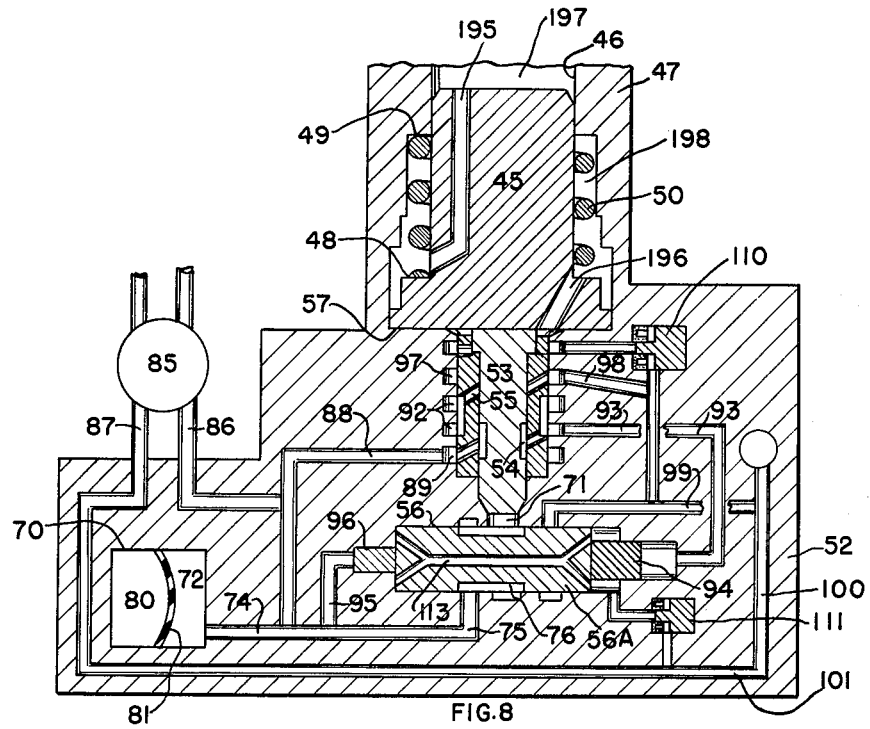
FIG. 8 is a schematic view in section of hydraulic motor means of FIGS. 3 and 4.

The impact piston chamber 71 is in communication with the fluid chamber 72 of the accumulator 70 through a plurality of small openings 73 (see FIG. 5) and conduit 74, 75 through annular piston groove 76 (see FIG. 8). The compressible gas chamber 80 of accumulator 70 is pressurized to a predetermined pressure, which, in the preferred embodiment, may be 800 to 900 p.s.i. When the stoper drill is not operating, the pressure in chamber 80 forces a diaphragm 81 against the opening 73. The diaphragm 81 is preferably molded from a suitable resilient material to which a thin metal diaphragm plate 82 is bonded in order to prevent possible damage to the diaphragm as a result of certain pressure conditions existing at times in the chamber or cavity 72. For example, when the machine is turned off and no oil pressure exists in the cavity 72, the accumulator gas pressure is such as would normally cause the resilient diaphragm portion 81 to extrude through the holes 73, but the thin metal plate 82 effectively prevents such occurrence.

Figure 9:
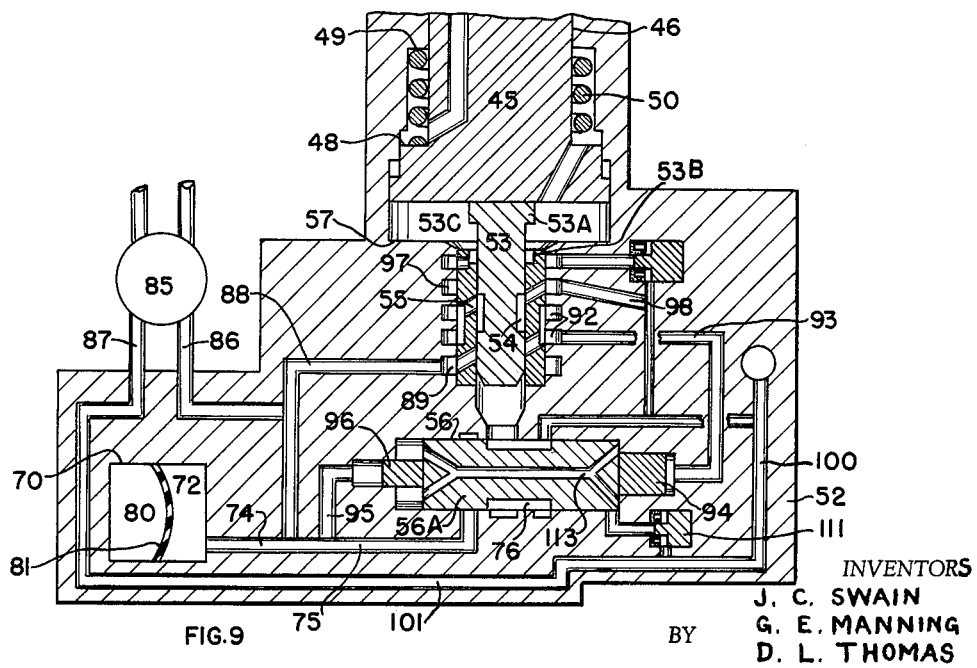
FIG. 9 is a schematic view in section similar to FIG. 8 but with the working parts positioned differently.
Figure 12:
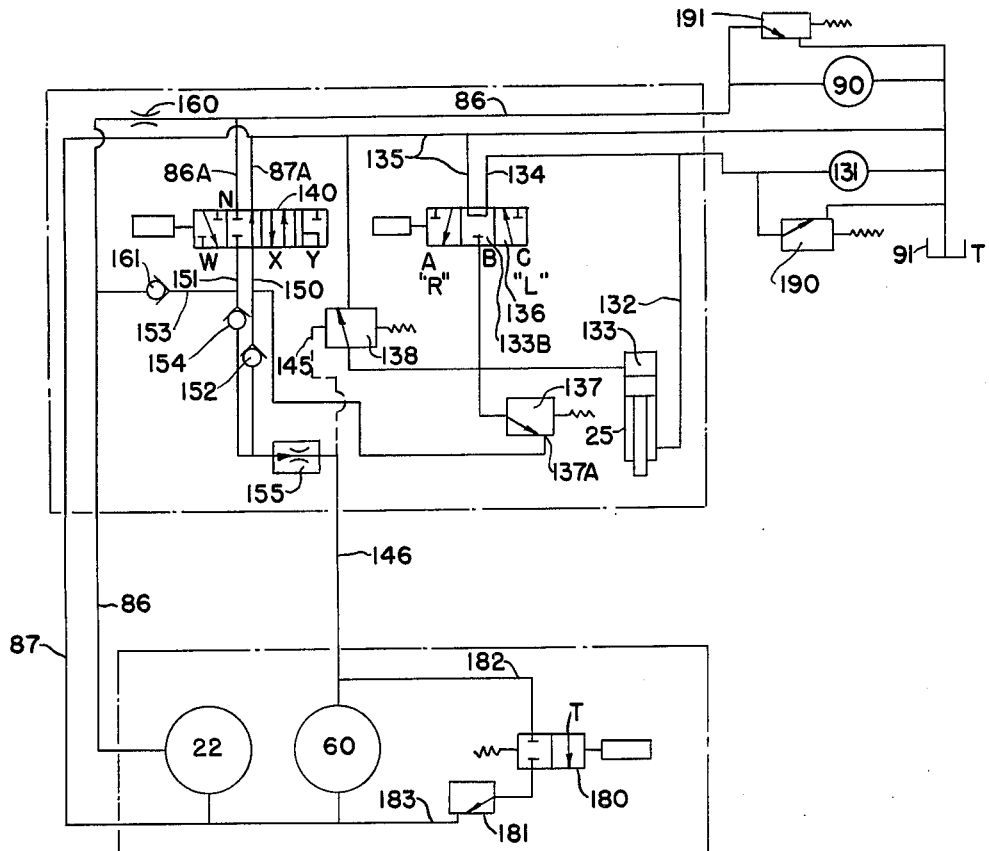
FIG. 12 is a schematic diagram of the hydraulic fluid pressure system of the invention.

For a detailed description of the impacting actuation of striker 45 by impact piston 53, reference is made to the diagram of FIG. 12 and the hydraulic circuitry disclosed in FIGURES 8 and 9. With valve 140 in impact position X or rotary impact position Y, hydraulic fluid under pressure enters housing 52 through a valve 85 in conduit 86. Conduit 96 is connected to a pump 90 through valve 85, which also connects return conduit 87 to a tank 91 (FIGURE 12). The hydraulic fluid is delivered to chamber 72 of accumulator 70 and thence to conduits 74 and 88 to annular piston grooves 89. Striker piston valving groove 54 communicates fluid pressure to valve actuator grooves 92 and conduit 93 to a valve actuating piston 94 to position valve 56a to the position shown in FIG. 8.

Fluid pressure from accumulator chamber 72 is continuously communicated by conduits 74 and 95 to valve actuating piston 96, which has a smaller cross-sectional area than piston 94. As a result of the difference in area between pistons 94 and 96, the valve 56a is positioned by piston 94 only when the striker piston 53 is in position to allow communication of fluid pressure from accumulator chamber 72 and valve actuating piston 94.

Hydraulic fluid pressure from chamber 72 is also communicated through conduit 75 to annular valve groove 76 to impact piston chamber 71 to provide fluid pressure for actuating impact piston 53 and striker 45 in what can be termed the power stroke to move striker 45 and compress spring 50.

During the power stroke of piston 53, the annular groove 54 upon being moved upwardly toward the striker 45 will break communication of fluid pressure between accumulator chamber 72 and valve actuating piston 94 to trap or capture all hydraulic fluid from piston 94 to grooves 92 until groove 54 is positioned to communicate with grooves 97 to allow the fluid to return to tank 91 via conduits 98, 99, 100, 101, and 87. This return conduit path is shown clearly in FIG. 9 with the impact piston 53 in an upward position.

FIG. 9 illustrates the hydraulic motor means in a position where all the components are in striking position. For example, striker 45 and impact piston 53 are at impact position with spring 50 compressed between annular shoulders 48, 49. With piston 53 and valve 56a in position as illustrated in FIG. 9, the fluid pressure is communicated from chamber 72 to annular groove 89, which is blocked by piston 53. However, the fluid pressure from accumulator chamber 72 is also communicated through conduits 74 and 95 to valve actuating piston 96. The fluid pressure thus acting on piston 96 shifts valve 56a to the right (as viewed in the drawings) as piston 94 is connected to return conduit 87 via conduit 93, grooves 92, port 55, annular piston groove 54, groove 97, conduits 98, 99, 100, and 101.

Chamber 72 is also in communication with conduit 75, but the position of valve 56a blocks the flow of fluid pressure and prevents it from reaching impact piston chamber 71 below impact piston 53. Chamber 71 is connected to conduit 99 through annular groove 76 to return conduits 100, 101, and 87. Thus, the spring 50 urges striker 45 and impact piston 53 toward the impact piston position shown in FIG. 8. When impact piston groove 54 reaches the position where the groove 54 is in communication with groove 89, fluid pressure will once again be effective to actuate valve actuating piston 94 to shift the valve 56a and allow chamber 71 to receive fluid pressure to move piston 53 through the impact cycle that drives striker 45 upwardly (as viewed in the drawings).

It should also be noted that the hydraulic system of FIGS. 8 and 9 includes two scavenging check valves 110 and 111. The check valve 111 for valve 56a allows return of fluid that leaks by valve 56a for return through conduits 112 and 101 to tank 91. The valve 56a has conduits 113 through the valve and a pumping action will be occasioned when valve 56a is moved from one end of its stroke to the other by reason of the sizing of conduit 113 and the provision of check valve 111. Leakage of fluids into chamber 56 is present and such fluid will be pumped past the scavenging check valve 111 and will be prevented from re-entering the valve chamber 56 by the check valve action.

Impact piston scavenging is accomplished by check valve 110 when the outside diameter 53a of piston 53 enters recess 53b to force fluid in the recess 53b past check valve 110 into return line 87 via conduits 99, 100, and 101.

Figure 10:
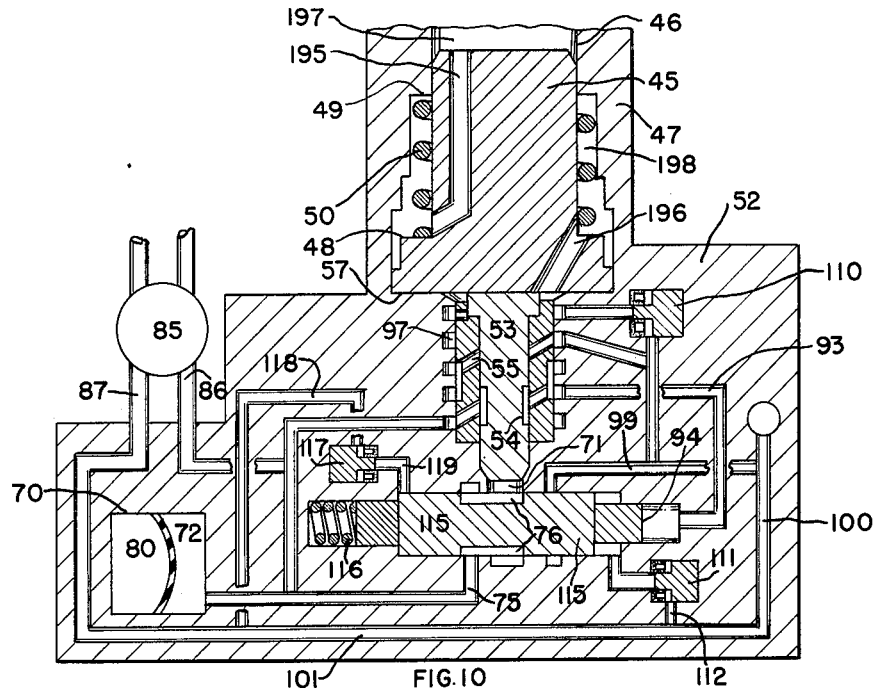
FIG. 10 is a schematic view in section of a modification of the device of FIG. 8.
Figure 11:
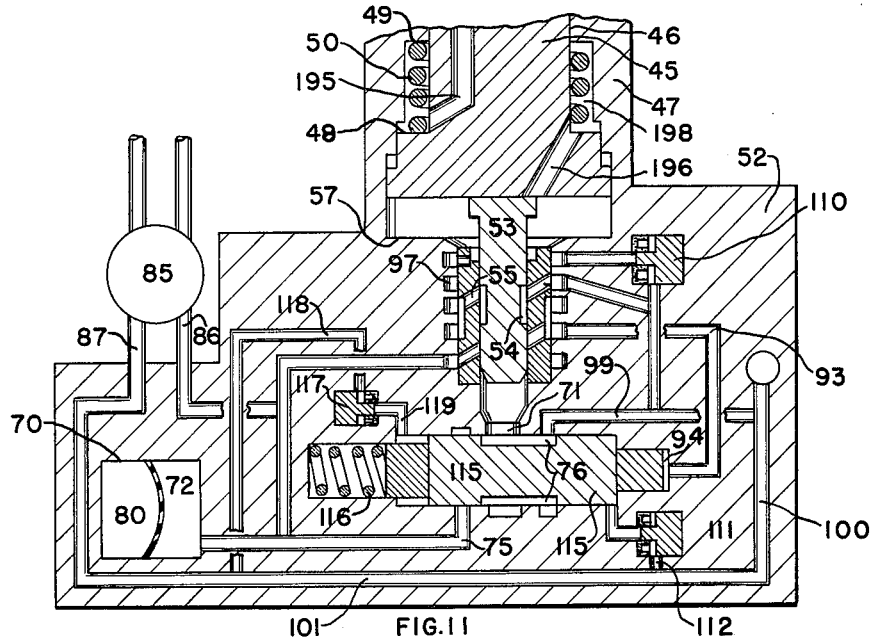
FIG. 11 is another schematic view in section similar to FIG. 10 but with the working parts in different positions.

In the modification shown in FIGURES 10 and 11, a valve 115 is shown as having a spring 116 for positioning the valve 115 to the right (as viewed in the drawings) when the fluid pressure from valve actuating piston 94 is returned to return conduit 87 as hereinabove described in conjunction with FIGS. 8 and 9. Thus, the actuation of impact piston 53 is similar to that described previously. In addition, another scavenging check valve 117 may be added for removing any leakage from valve 115 by movement through conduits 118, 119 to return conduit 87.

Figure 13:
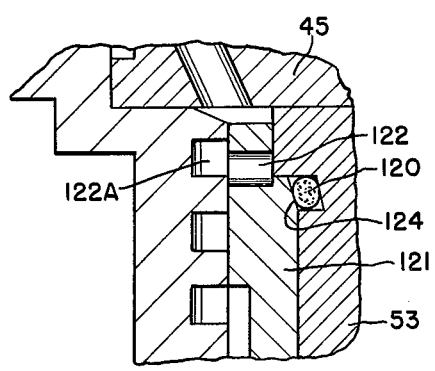
FIG. 13 is an enlarged partial section taken of a somewhat modified construction of the enclosed portion of FIG. 4.
Figure 14:
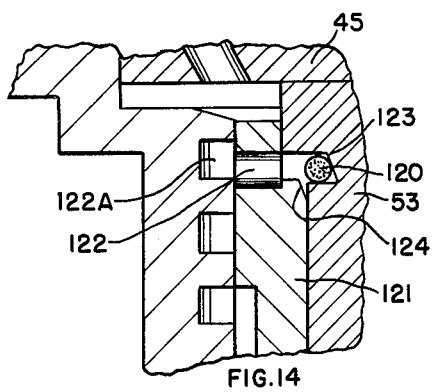
FIG. 14 is a partial section similar to the modification of FIG. 13 but with the parts positioned somewhat differently.
Figure 15:
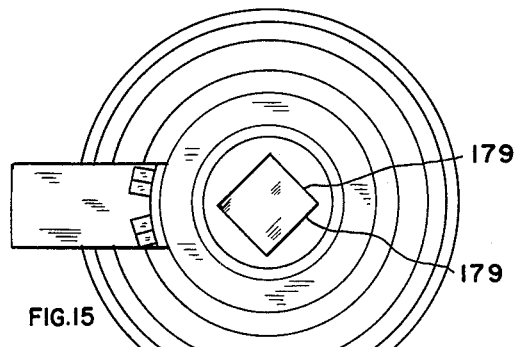
FIG. 15 is a plan view of a bolt tightening attachment operable by the hydraulic motor means.
Figure 16:
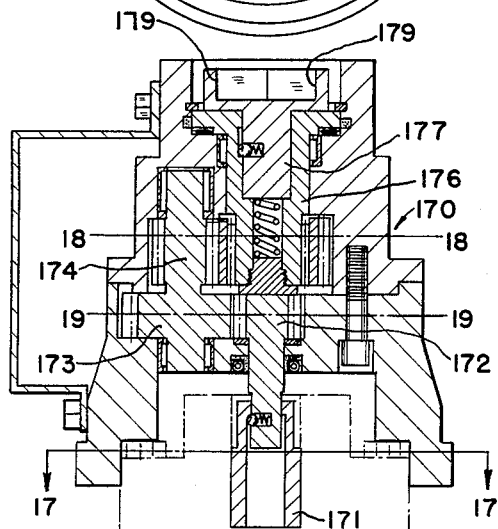
FIG. 16 is an elevation view in section of FIG. 15.
Figure 17:
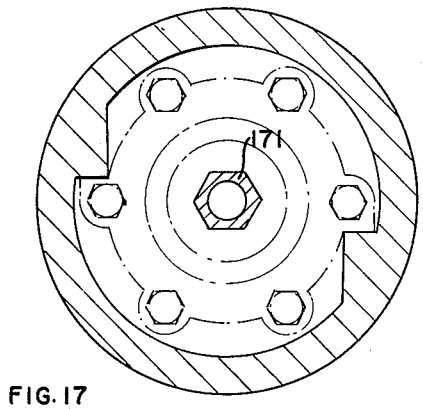
FIG. 17 is a plan view in partial section taken along line 17—17 of FIG. 16.
Figure 18:
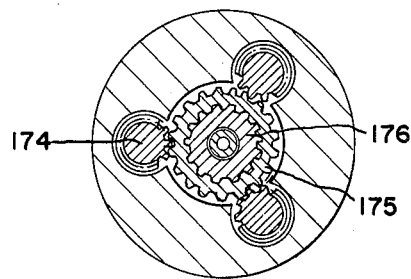
FIG. 18 is a plan view in section taken along line 18—18 of FIG. 16.
Figure 19:
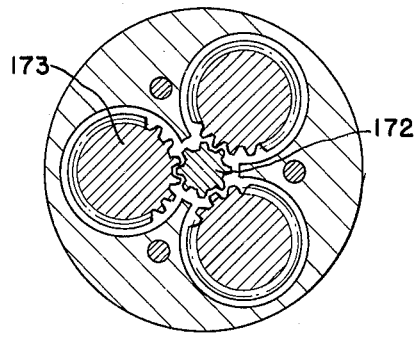
FIG. 19 is a plan view in section taken along the line 19—19 of FIG. 16.

In FIGS. 13 and 14 an enlarged sectional view illustrates a further modified arrangement for preventing leakage of fluid into the striker cavity 53c in which an O ring seal 120 located between piston 53 and cylindrical grooved member 121 having ports 122 for communicating with a port 122a for communicating with recess 53b. The sealing surfaces 123, 124 are at an angle with the direction of movement of impact piston 53, and they are substantially parallel to provide an effective seal to prevent hydraulic fluid flow with a minimum stroke of the impact piston 53. FIG. 13 illustrates the position of O ring seal 120 when the striker 45 is in its lowermost position (as viewed in the drawings), and FIG. 14 illustrates the position of the O ring 120 when the striker 45 is moved upwardly (as viewed in the drawings) by the actuation of impact piston 53 as hereinabove described in detail.

It should of course be understood that the present improvements may be utilized with equal advantage in impact drilling wherein the drill bit is merely indexed to a new striking position for each impact, or rotary impact drilling wherein the cutting by rotation of the bit is supplemented by impact blows, or rotary drilling in which the cutting is performed solely by bit rotation.

Reference is now made to FIG. 12 wherein the hydraulic control system 130 for the hydraulic stoper drill is illustrated schematically. A high volume hydraulic power source 90 provided with the usual components supplies hydraulic fluid under pressure through the conduit 86 to power the various modes of operation of the stoper drill, namely: rotary; rotary-impact, and impact.

In addition to the high volume pump 90, a low volume hydraulic power source 131 is used to supply fluid to the drill feed system.

The impact mechanism concerns the striker 45 and the hydraulic system described in conjunction with FIGS. 8, 9, 10, and 11 to provide the percussive action for the stoper drill. The rotary motor 60 as described hereinabove is of a gear type hydraulic motor to rotate the stoper drill steel 23.

As shown and described in detail in the copending application Serial No. 317,277 previously referred to, the feed cylinder 25 is double acting and is used to raise the stoper drill. Pressure fluid in conduit 132 from pump 131 is supplied at all times to cylinder 25 for retract feed of the drill whereas, the over-all cylinder diameter 133 is alternately connected to fluid supply line 134 or to a tank return line 135 by operation of hydraulic feed control valve 136 to raise or lower the stoper drill.

Pressure relief valves 137, 138 are included in the feed cylinder 25 circuit for varying the drill feed fluid pressures to suit the fluid pressure requirements of the various modes of drilling set out hereinabove. The function and operation of the pressure relief valves 137, 138 will be described in greater detail hereinafter in conjunction with the description of the various modes of operation and the regulating valve operation therefor.

The hydraulic feed control valve 136 is shown as a manually operated, spool type, hydraulic valve having three feed positions: Raise, "A," Neutral, "B," and Lower, "C." Fluid pressure is communicated to the valve 136 from pump 131 through conduit 134. In the neutral position "B," fluid is recirculated to conduit 135 to the return tank 91, and cylinder port 133b is blocked to hold the cylinder 25 in any position throughout the extent of cylinder 25 travel.

When valve 136 is positioned to raise position "A," conduit 134 is connected to cylinder chamber 133 through cylinder port 133b and the stoper drill is raised against the material to be drilled or worked.

When the valve 136 is positioned to lower position "C," the cylinder port 133b is directly connected to conduit 135 for return of fluid to the tank 91, which causes the fluid pressure in conduit 132 to retract the feed cylinder and lower the stoper drill.

Pressure relief valve 137 for the impact mode of operation is set at a relatively low hydraulic feed pressure, and the relief valve 137 functions only during the impact mode of operation requiring the lower feed pressures and during neutral position of the selector valve 140. The discharge port 137a of valve 137 is communicated to tank 91 through position "X" of mode selector valve 140. When the mode selector valve 140 is in either rotary mode position "W" or rotary-impact position "Y" the fluid pressure is introduced to the discharge 137a to make the valve 137 inoperative during rotary and rotary-impact modes of drilling.

Relief valve 138 is a pilot operated variable pressure relief valve. The valve 138 is included in the pressure feed control system in both the rotary and rotary-impact modes of drilling while the relief valve 137 is inoperative as described hereinabove. Valve 138 is to provide feeding pressures that are considerably higher than those that are regulated by relief valve 137. The discharge 138a of valve 138 is communicated directly to conduit 135 for return to tank 91. A pilot conduit 145 is connected to rotary motor fluid pressure conduit 146 so that feed pressure will vary inversely as pressure in conduit 146 for the rotary mode varies. The reduction of feed pressure prevents the rotary motor 60 from stalling and permits the motor 60 to produce maximum torque and thus maximum drill rate.

To control the various modes of drill operation, a mode selector control valve 140 is shown as a hydraulic spool valve having four positions: Rotary "W," Neutral "N," Impact "X," and Rotary-Impact "Y." The modes of operation as controlled by selector control valve 140 are described hereunder:

*Rotary mode*

For the rotary mode of operation, fluid pressure from pump 90 is communicated by conduit to valve 140 at control valve position "W" which connects conduits 86a to conduit 150. Conduits 151 and 87a are blocked. The fluid pressure flows through check valve 152 and is prevented from flowing to conduit 153 by a check valve 154. A variable volume pressure compensated flow regulator 155 regulates the fluid flow therethrough and such regulation determines the rotary speed of rotary drive motor 60. Fluid pressure from conduit 150 is also communicated to feed pressure relief valve 137 to render valve inoperative during the rotary mode of operation. However, pilot line pressure in conduit 145 is effective to operate valve 138 to control feed pressure during the rotary mode of drill operation.

Thus the stoper drill is operated to perform rotary operation, with appropriate fluid pressure connections to operate the feed of the drill in conjunction with the rotary operation.

*Neutral mode*

When the selector control valve 140 is positioned for the neutral mode of operation, valve 140 is connected to conduit 87a at control valve position "N." In the neutral position, fluid flow from pump 90 is blocked at conduit 86a, and conduit 151 for supplying fluid pressure for the impact cycle is also blocked. Conduit 150 is in communication with conduit 87a to the return tank 91.

In position "N" of valve 140, hydraulic fluid pressure from pump 90 will build up in conduit 86. A flow control valve 160 in conduit 86 allows a small amount of fluid pressure to reach the impact motor means 22. Check valve 161 is provided for insuring proper fluid flow to the impact motor means. This allows motor means 22 to operate at a slow impacting cycle to provide a scavenging action in the housing 52 as described in conjunction with FIGS. 8, 9, 10 and 11 hereinabove. Such scavenging action also takes place during the rotary mode of operation.

During the neutral mode of operation the drill may be positioned to any feed position by the valve 136, and pressure in the cylinder cavity 133 will be limited by valve 137.

*Impact mode*

When selector control valve 140 is positioned to impact control position "X," fluid pressure from high volume pump 90 is communicated through conduit 86, 86a to conduit 151, 153. Fluid pressure in conduit 153 opens check valve 161 to direct the fluid pressure to impact motor means 22 via conduit 86. Fluid pressure also flows through check valve 154 to flow regulating valve 155 to provide rotation during the impact mode of operation. Check valve 152 prevents any flow therethrough.

In impact position "X," valve 140 allows fluid pressure return through conduit 87a to tank 91. Discharge 137a of relief valve 137 is connected to conduit 150, and thus the relief valve 137 controls the feed pressure during the impact mode. The feed pressure regulated in valve 137 being of a lower pressure than the feed fluid pressure required for the rotary mode of operation as described hereinabove.

*Rotary-impact mode*

When the mode selector control valve 140 is moved to rotary-impact position "Y," the high volume pump 90 is connected to both conduits 150 and 151 which permits full fluid pressure to be communicated through conduits 153 and 146 to permit maximum operation of impact motor means 22 and rotary motor 60. As fluid pressure is communicated to discharge 137a of relief valve 137, this relief valve is made inoperative, and the regulation of feed fluid pressure occurs at pressure relief valve 138 in accordance with fluid pressure in pilot conduit 145 connected to conduit 146. Thus a greater feeding force is available by regulation through valve 138 as described hereinabove.

Thus the various mode of operating the drill have been described in conjunction with the drill system and the mode selector control system.

Reference is now made to the bolt tightener mechanism and control therefore as shown in FIGURES 12, 15, 16, 17, 18 and 19. The bolt tightening device 170 is adapted to be attached to the upper portion of motor means 22 wherein a coupling member 171 is insertable in recess 65 (see FIG. 4) in place of drill steel 23. Thus the coupling member 171 is adapted to be rotated by rotary motor 60 in the same manner as was the drill steel 23 as previously described. Rotation of coupling member 171 imparts rotation to gear 173 from gear 172 engageable with the coupling members 171. Integral with gear 173 is a gear 174 for driving a gear ring 175 in which splined support 176 is engaged and rotated. Support 176 is provided with a recess or bore 177 into which a bolt head engaging unit 178 is snap-fitted and for removable securement. The bolt head engaging unit 178 is provided with a recess 179 of predetermined dimensions for surrounding and engaging a bolt head (not shown) to be tightened by the rotating action imparted to unit 178 by motor 60.

A bolt tightener valve 180 (see FIG. 12) is actuated by the installation of the bolt tightener unit 170 described above. The valve 180 serves to connect or disconnect relief valve 181 through conduits 182, 183. Conduit 182 is directly connected to conduit 146 which supplies fluid pressure to rotary motor 60. The bolt tightening torque is thus regulated by the pressure in conduit 182 and the action of relief valve 181 when valve 180 is positioned to allow communication between conduit 182 and relief valve 181 through valve position "T". With the bolt tightener unit 170 installed, the valve 180 is positioned as at position "T" to connect the rotary motor fluid pressure to the relief valve 181, and conduit 183 is connected to conduit 87 for return to tank 91.

Thus a hydraulic motor means for a percussive rotary-impact rock drill has been described wherein various modes of operation of the drill may be selected to impact the necessary impact and rotary action in conjunction with drill feed control. In addition, the hydraulic system is adapted for use in conjunction with a means for tightening bolts with a simple attachment to the motor means and fluid system thereof.

While the improvements have been illustrated and described as being especially advantageously embodied in a percussive rock drill of the stoper type it is not intended to thereby unnecessarily limit or restrict the invention. It is also contemplated that certain descriptive terminology used herein shall be given the broadest possible interpretation consistent with the disclosure.

Suitable means should, of course, also be provided to insure against build-up of oil and provide for interchange of fluid in the piston chamber 197. For this purpose, ports 195, 196 may be formed in the piston 45 to thus provide intercommunication between the chambers 197, 198 and 53c.

Furthermore, upon occurrance of overtravel as when the chuck is not held down in normal impact position by the feed leg force occurring for example when the feed leg has attained full stroke, it is desirable to limit such overtravel because the kinetic energy of the striker must be absorbed internally. In this connection, it is only necessary to form the striker piston 53 with a step 54a extending from groove 54, thus providing means for causing a slowing of the cycle rate when there is striker overtravel and signalling a warning to the operator to stop the drill.

It should also be understood that while a particular scavenging arrangement has been shown and described, other means are capable of being employed without departing from the spirit of the present invention. Likewise, although the striker has been shown and described as being of two-piece configuration and while such structure does possess some advantages, a striker of unitary construction could be employed in place thereof.

Various modes of carrying out the invention are contemplated as being within the scope of the following claims particularly pointing out and distinctly claiming the subject matter which is regarded as the invention.

We claim:

1. A hydraulic driving apparatus comprising, a housing, a source of hydraulic fluid pressure communicating with said housing, a striker element slidably carried for reciprocation in said housing, resilient means urging said striker element in a first direction, an impact piston carried for reciprocation in said housing to move said striker element in a second direction to momentarily overcome said resilient means, a valve piston carried for reciprocation in said housing for controlling fluid pressure from said source to said impact piston, and an accumulator communicating with the hydraulic circuit closely adjacent to said impact piston to store energy and maintain fluid pressure simultaneously on said valve piston and said impact piston and thereby offset the variations in flow requirements during cycling of said impact piston.

2. Hydraulic driving apparatus according to claim 1, wherein the accumulator includes a chamber spanned by a flexible diaphragm and having the fluid conduits entering the chamber located medially of and directed toward said diaphragm.

3. Hydraulic driving apparatus according to claim 2, wherein the flexible diaphragm is provided with a thin metallic disk bonded to and covering the central portion thereof adjacent to and in alinement with entry conduits.

4. A hydraulic actuated striker means comprising, a housing supported by drill feed means, a striker element carried by said housing for reciprocable movement therein to strike a drill means, resilient means within said housing for urging said striker element in a first direction away from said drill means, a striker piston actuatable by fluid pressure and adapted to move said striker element in a second direction to impact said drill means and to return to an initial position as said striker element is moved away from said drill means by said resilient means, a fluid pressure valve piston carried for reciprocating movement in said housing for controlling fluid pressure to said striker piston, and an accumulator for maintaining fluid pressure simultaneously on said valve piston and said striker piston.

5. The apparatus recited in claim 4, wherein scavenger means is provided for the striker element chamber and the valve chamber for returning fluid pressure to said source.

6. A hydraulic motor means for a rotary impact percussive drill comprising, a source of fluid pressure for said hydraulic motor means, a housing for said hydraulic motor means, drill feed structure supporting said housing and said drill, a striker element carried for reciprocating motion within a longitudinal bore of said housing, valve means positioned by fluid pressure for moving the striker element in a first direction under the influence of fluid pressure, resilient means for urging said striker element is a second direction, and an accumulator interposed between said source of fluid pressure and said fluid pressure means and ported to maintain continuous fluid pressure simultaneously on said valve means and on said striker element in a discontinuous fluid pressure system.

7. A hydraulic control system for a rotary percussive stoper drill having fluid pressure feed means including, in combination, a source of hydraulic fluid pressure for powering a rotary impact hydraulic motor means of said stoper drill, a selector valve connected to said source of hydraulic fluid pressure for selecting a mode of operation of said drill, a return system for hydraulic fluid, impact hydraulic motor means for said stoper drill connected to said selector valve, rotary hydraulic motor means for said stoper drill connected to said selector valve, and means for positioning said selector valve for variously actuating said impact hydraulic motor means and said rotary hydraulic motor means to cause impacting, rotation, or rotary impacting of said stoper drill.

8. A hydraulic control system for a rotary percussive stoper drill having fluid pressure feed means including, in combination, a first source of hydraulic fluid pressure for powering a rotary impact hydraulic motor means of said stoper drill, a second source of hydraulic fluid pressure for powering said fluid pressure drill feed means, a selector valve connected to said first source of hydraulic fluid pressure for selecting a mode of operation of said drill, a drill feed control valve connected to said second source of fluid pressure for controlling the feed of said stoper drill, a return system for hydraulic fluid, impact hydraulic motor means for said stoper drill connected to said selector valve, rotary hydraulic motor means for said stoper drill connected to said selector valve, drill feed means connected to said feed control valve for raising, lowering, or maintaining stoper drill feed, means for positioning said selector valve for variously actuating said impact hydraulic motor means and said rotary hydraulic motor means to cause impacting, rotation, or rotary impacting of said stoper drill, and means for positioning said feed control valve for variously actuating said feed motor means to raise, lower, or maintain said stoper drill during neutral position.

9. The hydraulic control system of claim 8, wherein said system includes a first pressure relief valve for controlling drill fluid pressure when said selector valve is in impact position, a second pressure relief valve for controlling feed fluid pressure when said selector valve is in a rotary impact position, and means for rendering said first pressure relief valve ineffective when said selector valve is in rotary impact position.

10. The hydraulic control system of claim 8, wherein said impact hydraulic motor means is connected to said first source of fluid pressure and includes a striker piston communicating with said first source of fluid pressure for an impact stroke via a grooved reciprocating valve actuated by said first source of fluid pressure at opposite ends of said valve, said reciprocating valve having a greater effective area at one end than its other wherein said first source of fluid pressure positions said valve through said striker piston toward the end having a lesser effective area thereby initiating the impact stroke, and striker piston return means for returning said piston after the impact stroke.

11. The impact hydraulic motor means of claim 10, wherein said grooved reciprocating valve is provided with a resilient means that is compressed by the urging of fluid pressure during the initiation of the impact stroke.

12. The hydraulic control system of claim 8, wherein a fluid pressure accumulator is interposed between said first source of fluid pressure and said impact hydraulic motor means for averaging fluid pressure demands of impacting in a discontinuous impacting mode of operation.

13. A hydraulic motor for a rotary percussive stoper rock drill including a source of hydraulic fluid pressure; a housing for said hydraulic motor; a striker piston for actuating a striker element of said rock drill; flow distributing means including a bore for receiving said striker piston for reciprocating movement therein; said striker piston being provided with an annular groove for providing communication of fluid pressure between said source and said flow distributing means; a valve carried for reciprocating movement in said housing and provided with an annular groove for communicating fluid pressure to said striker piston; a valve actuator at each end of said valve for reciprocating said valve under the action of fluid pressure; conduits simultaneously connecting said source of fluid pressure to said flow distributing means and through said striker piston annular groove selectively to said valve actuators and to the annular groove of said valve to thereby move said striker piston longitudinally of said flow distributing means to an impact position; return fluid pressure conduits connected to said flow distributing means and to said valve piston for returning fluid pressure to said fluid pressure source when said striker piston completes longitudinal movement within the bore of said flow distributing means to connect said striker piston annular groove and said valve piston annular groove to said return fluid pressure conduits, and resilient means for returning said striker piston to a position wherein the fluid pressure source is communicated through said striker piston annular groove to actuate said valve piston to again supply fluid pressure through said valve piston annular groove to position said striker piston and striker to impact position against the impacted element of said drill.

14. The hydraulic motor of claim 10, wherein scavenger means are provided in the return fluid pressure conduits for providing scavenging action at said striker piston chamber and said valve piston chamber.

15. The hydraulic motor of claim 10, wherein an accumulator means is interposed in said fluid pressure conduits between said source of fluid pressure and said striker and valve pistons.

16. The hydraulic motor of claim 12, wherein the accumulator means includes a resilient diaphragm dividing said accumulator means into a pressurized gas chamber and a hydraulic fluid pressure chamber, said hydraulic fluid pressure chamber being provided with a plurality of openings for communicating fluid pressure to said fluid pressure conduits.

17. The hydraulic motor of claim 10, wherein said valve piston carried for reciprocating movement in said housing includes a resilient means for urging said valve piston annular groove out of communication with said source of fluid pressure when said striker piston approaches impact position.

18. A hydraulic motor for a rotary percussive stoper rock drill including a source of hydraulic fluid pressure; a housing for said hydraulic motor; a striker piston for moving a striker element of said rock drill; flow distributing means including a bore for receiving said striker piston for reciprocating movement therein, said striker piston being provided with an annular groove for providing communication of fluid pressure between said source and said flow distributing means; a valve piston carried for reciprocating movement in said housing and provided with an annular groove for communicating fluid pressure to said striker piston, said valve piston also being reciprocated by said source of fluid pressure; conduits connecting said source of fluid pressure to said valve piston and to the annular groove thereof to provide for communication of said source of fluid pressure to said striker piston to move said striker piston longitudinally of said bore to an impact position; return conduits connected to said flow distributing means and to said valve piston when said striker piston completes longitudinal movement within said bore to connect said valve piston annular groove to said return fluid pressure conduits, and resilient means for returning said striker piston to a position wherein the fluid pressure source actuates said valve piston to again supply fluid pressure through said valve piston annular groove to move said striker piston to impact position.

References Cited by the Examiner

UNITED STATES PATENTS

| | | | |
|---|---|---|---|
| 1,662,792 | 3/1928 | Osgood | 173—105 X |
| 2,355,357 | 8/1944 | Adams et al. | 60—51 X |
| 2,731,796 | 1/1956 | Sublett et al. | 60—51 |
| 3,058,310 | 10/1962 | Panissidi | 60—51 X |

SAMUEL LEVINE, *Primary Examiner.*

EDGAR W. GEOGHEGAN, *Examiner.*